(12) United States Patent  
Schoenberg et al.

(10) Patent No.: US 11,078,963 B2
(45) Date of Patent: Aug. 3, 2021

(54) BEARING BUSH

(71) Applicant: Carl Freudenberg KG, Weinheim (DE)

(72) Inventors: Frank Schoenberg, Lampertheim (DE); Matthias Hauer, Weinheim (DE); Christoph L. Klingshirn, Eppelheim (DE); Wojciech Kokoszynski, Mannheim (DE); Randolph Gaa, Viernheim (DE); Stephen Joyce, North Shields (GB); Joram Wiggers, Chester-le-Street (GB); Dean Morrison, Newcastle Upon Tyne (GB); Simon Watling, Blyth (GB); Juergen Emig, Grasellenbach (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 16/798,488

(22) Filed: Feb. 24, 2020

(65) Prior Publication Data

US 2020/0277992 A1  Sep. 3, 2020

(30) Foreign Application Priority Data

Feb. 28, 2019  (DE) .......................... 102019105112.6

(51) Int. Cl.
*F16C 33/74* (2006.01)
*F16C 17/02* (2006.01)

(52) U.S. Cl.
CPC .............. *F16C 33/74* (2013.01); *F16C 17/02* (2013.01)

(58) Field of Classification Search
CPC .... F16C 17/02; F16C 9/02; F16C 9/04; F16C 33/20; F16C 33/74; F16C 2326/24
See application file for complete search history.

(56) References Cited

U.S. PATENT DOCUMENTS

| 3,322,475 | A | | 5/1967 | Schick | |
|---|---|---|---|---|---|
| 5,490,731 | A | * | 2/1996 | Scharf | F16C 33/74 277/572 |
| 5,836,699 | A | | 11/1998 | Back | |
| 7,343,681 | B2 | * | 3/2008 | Vogt | F16C 33/145 29/898.042 |
| 8,231,275 | B2 | * | 7/2012 | Krause | F16C 17/02 384/129 |
| 2004/0057643 | A1 | * | 3/2004 | Blanchard | F16C 33/04 384/276 |

(Continued)

FOREIGN PATENT DOCUMENTS

| DE | 1400967 A1 | | 11/1968 |
|---|---|---|---|
| DE | 4239938 | * | 4/1994 |
| DE | 4435098 A1 | | 4/1996 |

(Continued)

*Primary Examiner* — James Pilkington
(74) *Attorney, Agent, or Firm* — Leydig, Voit & Mayer, Ltd.

(57) ABSTRACT

A bearing bush includes at least one sealing element and one bearing element. The sealing element is provided with at least one sealing lip. The bearing element is substantially tubular. The bearing element includes a plurality of protrusions extending in the axial direction on the outer circumference. The inner diameter of the bearing element is larger in the sections corresponding to the protrusions than in the remaining sections.

13 Claims, 4 Drawing Sheets

(56) References Cited

U.S. PATENT DOCUMENTS

2010/0282547 A1    11/2010  Fischer et al.

FOREIGN PATENT DOCUMENTS

| DE | 102014000197 A1 |   | 1/2014 |
|----|-----------------|---|--------|
| FR | 1310614 A       |   | 11/1962 |
| FR | 26747918        | * | 10/1992 |
| WO | WO 2009059762 A1 |  | 5/2009 |

\* cited by examiner

BEARING BUSH

CROSS-REFERENCE TO PRIOR APPLICATIONS

Priority is claimed to German Patent Application No. DE 10 2019 105 112.6, filed on Feb. 28, 2019, the entire disclosure of which is hereby incorporated by reference herein.

FIELD

The invention relates to a bearing bush. The bearing bush can include at least one sealing element and one bearing element. The sealing element can be provided with at least one sealing lip. The bearing element can be substantially tubular.

BACKGROUND

Bearing bushes are frequently used for supporting steering rods in vehicles. The sealing element integrated into the bearing bush rests elastically and with radial prestressing against the steering rod and prevents dirt or moisture from penetrating into the bearing bush. The bearing bush should be designed in such a way that it can absorb transverse forces with negligible deformation and low eccentricity.

SUMMARY

In an embodiment, the present invention provides a bearing bush including at least one sealing element and one bearing element. The sealing element is provided with at least one sealing lip. The bearing element is substantially tubular. The bearing element includes a plurality of protrusions extending in the axial direction on the outer circumference. The inner diameter of the bearing element is larger in the sections corresponding to the protrusions than in the remaining sections.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
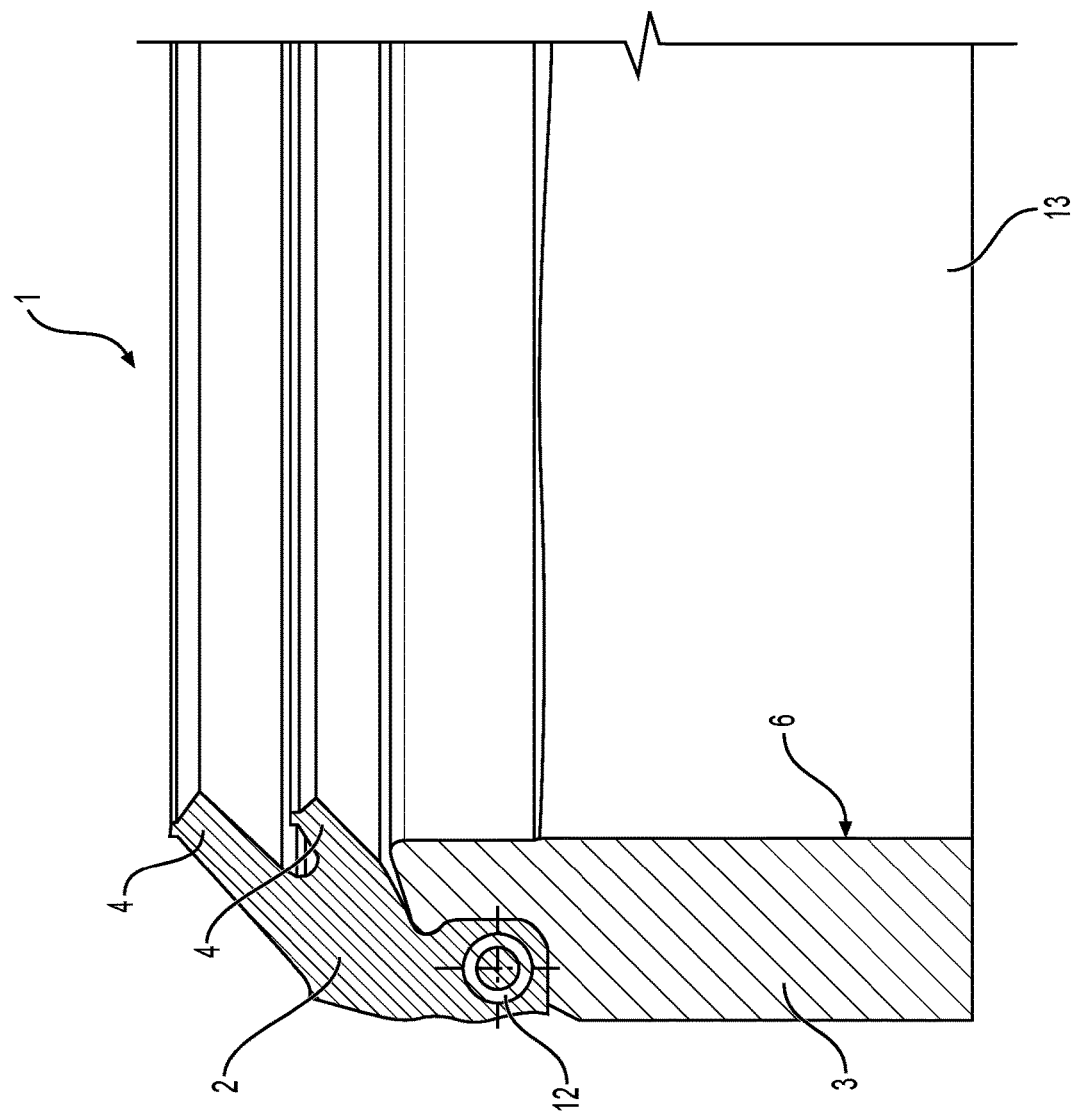
FIG. 1 depicts a bearing bush in half-section, according to an embodiment.

A problem that occurs when assembling a bearing bush and/or the steering rod is that manufacturing tolerances can lead to large variation in the required assembly force. This applies in particular when key components of the bearing bush are made of plastic.

In principle, it is possible to change the dimensions of the components to be assembled by addition of heat or dissipation of heat in such a way that assembly with less force is possible. However, this increases the complexity of assembly. Alternatively, it is possible to provide the outer circumference of the machine element to be supported with an elastomeric coating, which can compensate for tolerances on account of its deformability. In this case, the problem is that deformation of the elastomer layer results in increased eccentricity when a transverse load is absorbed.

It is further possible to provide the outer diameter of the bearing with ribs. In the case of thin-walled bearing bushes, however, this is accompanied by severe deformation of the bore of the bearing bush, that is to say, with a change in the inner diameter. This can result in excessive clearance between the bearing bush and the machine element to be supported.

An embodiment of the invention provides a bearing bush which can compensate for a high transverse load during operation while being easy to assemble.

A bearing bush according to an embodiment of the invention includes at least one sealing element and one bearing element, wherein the sealing element is provided with at least one sealing lip, wherein the bearing element is substantially tubular, wherein the bearing element has on the outer circumference a plurality of protrusions extending in the axial direction, wherein the inner diameter of the bearing element is greater in the sections corresponding to the protrusions than in the remaining sections.

In an embodiment, the bearing bush can deform into a receiving bore during assembly, resulting in decreased assembly forces. Since the inner diameter of the bearing element is larger in the sections corresponding to the protrusions than in the remaining sections, the deformation of the bearing element is compensated for in such a way that a machine element to be supported by the bearing element can be supported with a small bearing clearance and no impermissibly high eccentricity results in the event of a load.

In an embodiment, the bearing element is designed such that it is thin-walled. A bearing element is thin-walled if the wall thickness of the bearing element is eight to twelve times smaller than the outer diameter of the bearing element. For example, if the bearing element has an outer diameter of 25 mm, the inner diameter of the bearing element, i.e. the diameter of the bore of the bearing element, is 20 mm. In the case of such a bearing element, a wall thickness of 2.5 mm results if the wall thickness of the bearing element is ten times smaller than its outer diameter. If such a bearing element is pressed into a receiving bore, the bearing element deforms in such a way that, after assembly, an inner diameter with only very low eccentricity results, so that a machine element, for example a steering rod, can then be received with a small bearing clearance.

The inner diameter of the bearing element can change continuously as viewed along the circumference. In an advantageous embodiment, the inner diameter of the bearing element changes sinusoidally in the circumferential direction. In this case, the advantage is that a particularly good load distribution results during the assembly of the bearing bush, which in turn is accompanied by a particularly low eccentricity of the inner diameter of the bearing element.

The bearing element can have four to twelve protrusions. In this case, the number of protrusions depends in particular on the outer diameter of the bearing element, wherein the bearing element preferably has more protrusions the larger the outer diameter. For use of the bearing bush as a bearing bush for supporting a steering rod, it is advantageous if the bearing element has six to ten protrusions.

The height of the protrusions is preferably between 0.9% and 1.5% of the outer diameter of the bearing element in each case. If the bearing element has an outer diameter of 25 mm, the height of a protrusion is correspondingly between 0.225 mm and 0.375 mm. It has been found that a bearing element designed in this way can be assembled with a low assembly force at the expected tolerances and has only a very low eccentricity with regard to the inner diameter.

The protrusions preferably each extend over 4% to 10% of the circumference of the bearing element. If the bearing element has an outer diameter of 25 mm, the protrusions correspondingly each extend over 1 mm to 2.5 mm of the circumference of the bearing element.

The protrusions preferably take the form of ribs. A bearing element designed in this way is particularly simple to manufacture.

The inner diameter of the bearing bush can be enlarged or reduced by up to 0.2% of a mean inner diameter, as viewed along the circumference. For an inner diameter of 20 mm, the inner diameter accordingly changes by 0.04 mm. In the case of a sinusoidal change in the inner diameter, the inner diameter accordingly ranges between 19.96 mm and 20.04 mm. The average internal diameter is 20 mm.

The bearing element is preferably made of plastic. Especially when the bearing bush is used as a bearing bush for a steering rod, plastic is the preferred material because of the expected bearing forces. In this case, the advantage is that support can be provided without lubricant. Furthermore, bearing bushes made of plastic can be manufactured cost-effectively. Advantageous plastics here are polyamide (PA), in particular polyamide 6.6, polybutylene terephthalate (PBT) or polytetrafluoroethylene (PTFE). The use of fiber-reinforced plastics is also possible.

In order to prevent dirt or moisture from penetrating into the bearing element, the bearing bush is provided with a sealing element. The sealing element has a sealing lip which, after assembly under radial prestressing, rests with sealing effect against the machine element to be supported.

In an embodiment, the sealing element comprises two sealing lips which are arranged at an axial distance from one another and, after assembly with radial prestressing, each abut the machine element to be supported. The double sealing lip results in a particularly good sealing effect.

The sealing element is preferably formed from an elastomeric material, for example from acrylonitrile butadiene rubber (NBR). Depending on the application, it is also possible to form the sealing element from ethylene propylene diene monomer (EPDM). Further possible materials are thermoplastic elastomers.

The sealing element preferably has a form-locked connection with the bearing element. As a result, it is possible to manufacture the sealing element and the bearing element independently of one another out of different materials and to assemble them later.

For this purpose, the bearing element can have a recess on one end face in the region of the outer circumference, wherein the end face is given an enlarged cross section. Because of the enlargement of the cross section, a congruently shaped sealing element can be affixed in a captive manner in the recess. To improve the captive fit, a spring element, for example an annular coil spring, which presses the sealing element against the bearing element, can be arranged in the sealing element.

FIG. 1 shows a bearing bush 1 with a sealing element 2 and a bearing element 3. The sealing element 2 is provided with two parallel and axially spaced sealing lips 4 which project axially from the bearing bush 1 and extend radially inward.

The bearing element 3 is of tubular design and is provided with a bore 13 for receiving a machine element to be supported.

In the present embodiment, the sealing element 2 is formed from NBR and the bearing element 3 is made of polyamide 6.6. Both the sealing element 2 and the bearing element 3 are injection-molded parts.

In an embodiment, the bearing bush 1 supports a steering rod of a motor vehicle. In an alternative embodiment, the bearing bush 1 supports elements of suspension forks of two-wheeled vehicles.

Figure 2:
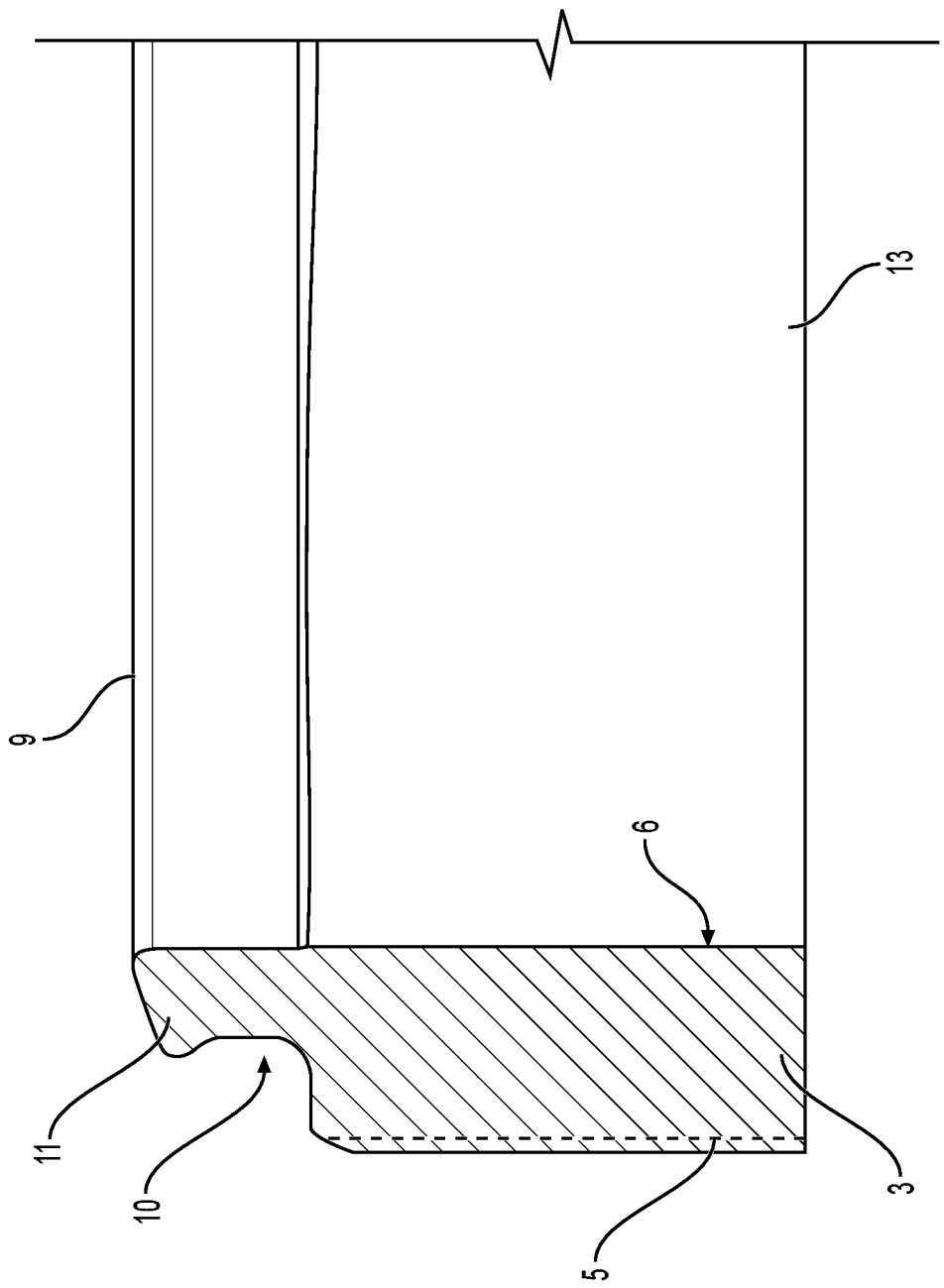
FIG. 2 depicts detail of the bearing element of the bearing bush in half-section, according to an embodiment.

FIG. 2 shows in detail the bearing element 3 of FIG. 1. The bearing element 3 has on its outer circumference a plurality of protrusions 5 running in the axial direction. Furthermore, the inner diameter 6 of the bearing element 3 is larger in the sections corresponding to the protrusions 5 than in the other sections.

The bearing element 3 has on one end face 9 a circumferential recess 10 followed by an enlargement of the cross section 11 in the direction of the end face 9. The recess 10 receives the sealing element 2, wherein the sealing element 2 has a form-locked connection with the bearing element 3 as a result of the enlargement of the cross section 11.

Figure 3:
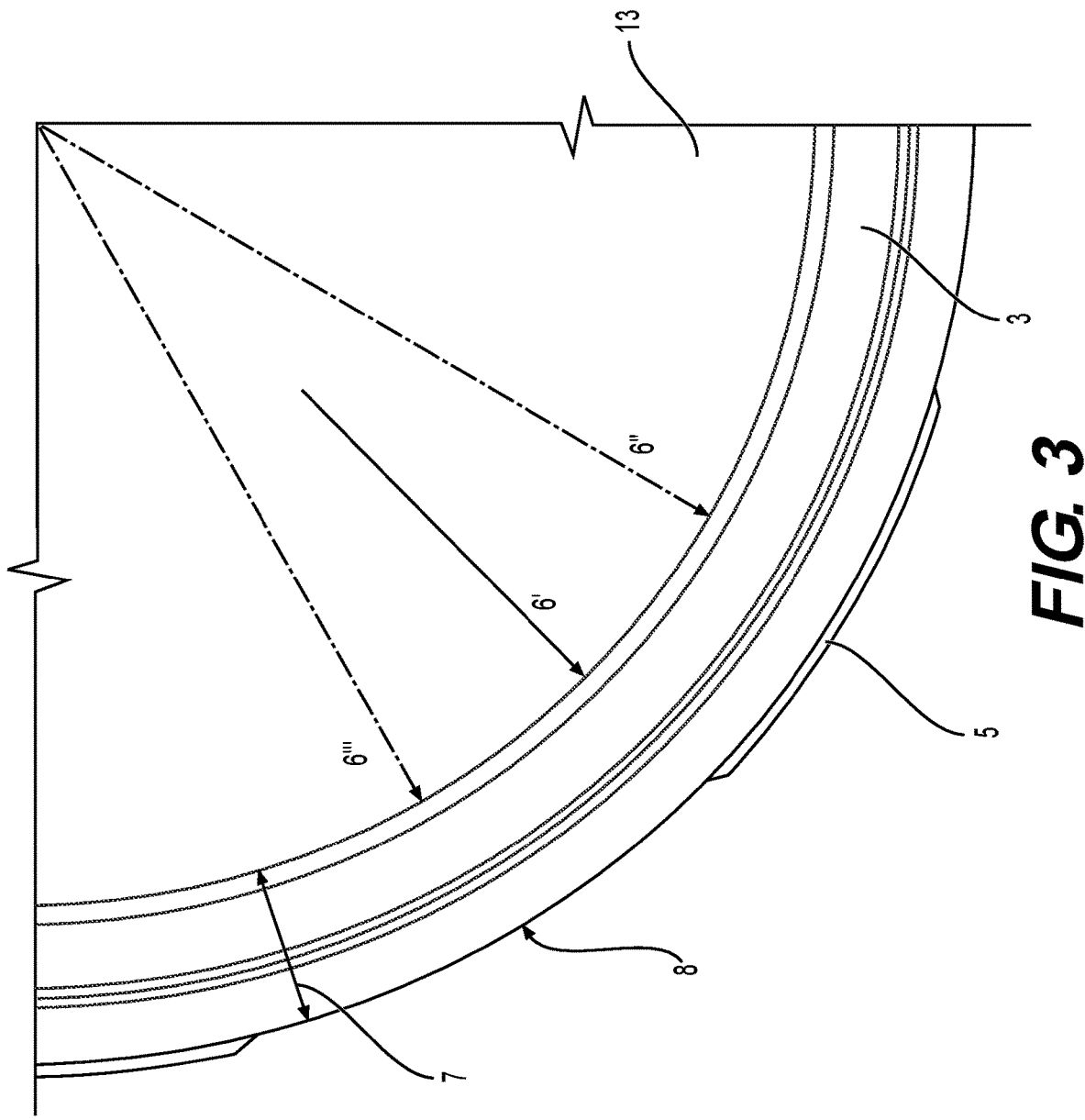
FIG. 3 depicts detail of the bearing element in plan view, according to an embodiment.

FIG. 3 shows the bearing element 3 in plan view. In the present embodiment, the bearing element 3 has six protrusions 5 on the outer circumference. The height of the protrusion 5 is in each case 1.2% of the outer diameter 8 of the bearing element 3. Furthermore, the protrusions 5 extend over 8% of the circumference of the bearing element 3.

FIG. 3 also shows that the inner diameter 6 of the bearing element 3 changes continuously along the circumference. In the present embodiment, the inner diameter 6 of the bearing element 3 changes sinusoidally in the circumferential direction.

The inner diameter 6 of the bearing element 3 decreases or increases by 0.1% of a mean inner diameter 6', as viewed along the circumference. This results in a maximum inside diameter 6", which corresponds to the protrusions 5 and which is 0.2% greater than the mean diameter 6'. A smallest inner diameter 6" arises between the protrusions 5, which is 0.2% smaller than the average inner diameter 6'.

The wall thickness 7 of the bearing element 3 is 18% of the outer diameter 8 of the bearing element 3. The protrusions 5 take the form of ribs.

Figure 4:
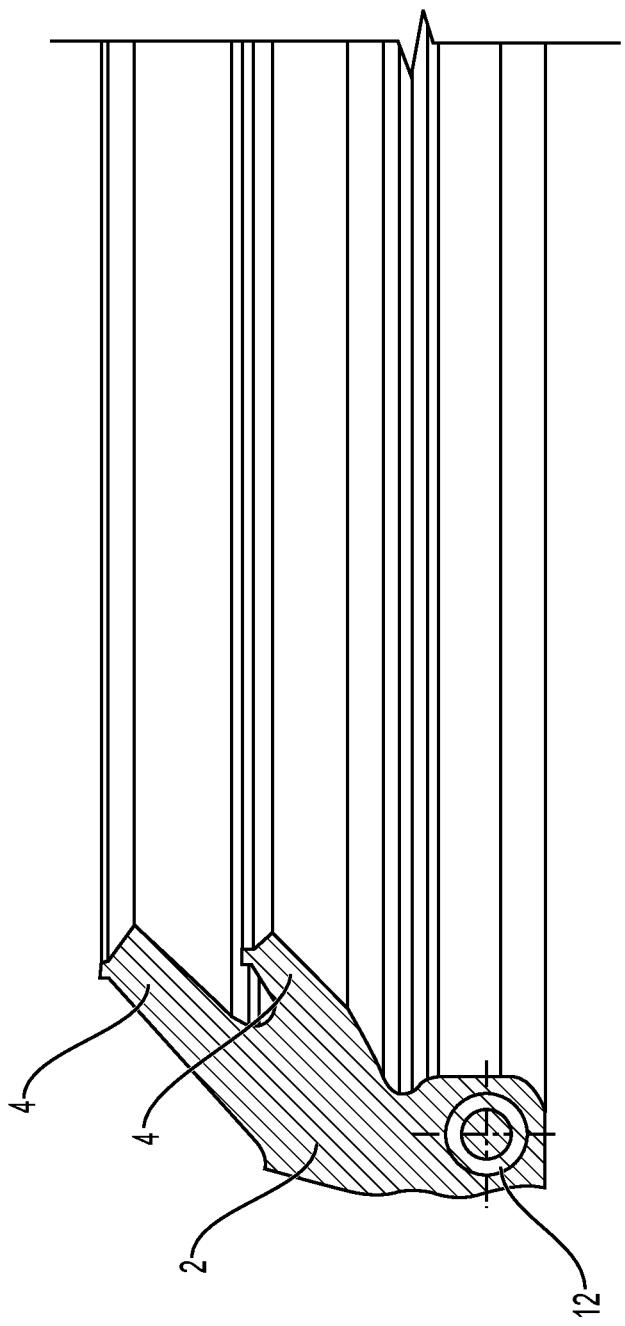
FIG. 4 depicts detail of the sealing element of the bearing bush in half-section, according to an embodiment.

FIG. 4 shows in detail the sealing element 2. In the section of the sealing element 2 corresponding to the recess 10, the sealing element 2 has an integrated spring element 12 in the form of an annular coil spring. The spring element 12 causes the sealing element 2 to be pressed radially into the recess 10.

Referring to FIG. 1, an embodiment of the present invention provides a bearing bush 1, comprising at least one sealing element 2 and one bearing element 3, wherein the sealing element 2 is provided with at least one sealing lip 4, wherein the bearing element 3 is substantially tubular, wherein the bearing element 3 has a plurality of protrusions 5 extending in the axial direction on the outer circumference, wherein the inner diameter 6 of the bearing element 3 is larger in the sections corresponding to the protrusions 5 than in the remaining sections.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A bearing bush comprising:
   at least one sealing element comprising an elastomeric material and an integrated spring; and
   at least one bearing element,
   wherein the at least one sealing element is provided with at least one sealing lip,
   wherein the at least one bearing element is substantially tubular, the at least one bearing element comprising a plurality of protrusions extending in an axial direction on an outer circumference of the at least one bearing element, and
   wherein an inner diameter of the at least one bearing element is larger in sections corresponding to the protrusions than in remaining sections,
   wherein the spring is located in a circumferential recess of the at least one bearing element to secure the at least one seal to the at least one bearing element.

2. The bearing bush according to claim 1, wherein a wall thickness of the at least one bearing element is eight to twelve times smaller than an outer diameter of the at least one bearing element.

3. The bearing bush according to claim 1, wherein the inner diameter of the at least one bearing element changes continuously along an inner circumference of the at least one bearing element.

4. The bearing bush according to claim 1, wherein an inner diameter of the at least one bearing element changes sinusoidally in a circumferential direction.

5. The bearing bush according to claim 1, wherein the at least one bearing element has four to twelve protrusions.

6. The bearing bush according to claim 1, wherein a height of the protrusions corresponds in each case to between 0.9% and 1.5% of an outer diameter of the at least one bearing element.

7. The bearing bush according to claim 1, wherein the protrusions each extend over 4% to 10% of the outer circumference of the at least one bearing element.

8. The bearing bush according to claim 1, wherein the protrusions comprise ribs.

9. The bearing bush according to claim 1, wherein an inner diameter of the at least one bearing element increases or decreases by up to 0.2% of a mean inner diameter, viewed along an inner circumference of the at least one bearing element.

10. The bearing bush according to claim 1, wherein the at least one bearing element comprises plastic.

11. The bearing bush according to claim 1, wherein the at least one sealing lip projects in the axial direction relative to the bearing bush.

12. A bearing bush comprising:
    at least one sealing element and one bearing element,
    wherein the sealing element is provided with at least one sealing lip, the bearing element is substantially tubular, the bearing element comprises a plurality of protrusions extending in the axial direction on the outer circumference, and the inner diameter of the bearing element is larger in the sections corresponding to the protrusions than in the remaining sections,
    wherein a wall thickness of the bearing element is eight to twelve times smaller than the outer diameter of the bearing element.

13. A bearing bush comprising:
    at least one sealing element; and
    at least one bearing element,
    wherein the at least one sealing element is provided with at least one sealing lip,
    wherein the at least one bearing element is substantially tubular, the at least one bearing element comprising a plurality of protrusions extending in an axial direction on an outer circumference of the at least one bearing element, and
    wherein an inner diameter of the at least one bearing element is larger in sections corresponding to the protrusions than in remaining sections,
    wherein the at least one sealing element has a form-locked connection with the at least one bearing element, and
    wherein a wall thickness of the at least one bearing element is eight to twelve times smaller than an outer diameter of the at least one bearing element.

* * * * *